United States Patent [19]
Jehle

[11] 3,971,931
[45] July 27, 1976

[54] LED IMAGE TUBE LIGHT VALVE

[75] Inventor: Robert E. Jehle, Silver Spring, Md.

[73] Assignee: The United States of America as represented by the Secretary of the Navy, Washington, D.C.

[22] Filed: Jan. 23, 1975

[21] Appl. No.: 543,383

[52] U.S. Cl. .................. 250/213 R; 250/213 VT; 250/331; 250/484; 313/117; 350/160 LC
[51] Int. Cl.² ............................................. G02F 1/13
[58] Field of Search ......... 250/213 R, 213 VT, 331, 250/484; 350/160 LC; 313/96, 117

[56] References Cited
UNITED STATES PATENTS

| | | | |
|---|---|---|---|
| 3,479,517 | 11/1969 | Bray et al. .................... | 250/213 R X |
| 3,774,124 | 11/1973 | Ziemelis et al. ........... | 250/213 VT X |
| 3,824,002 | 7/1974 | Beard.............................. | 250/331 X |
| 3,829,684 | 8/1974 | Assouline et al................ | 250/213 R |

OTHER PUBLICATIONS

*Liquid Crystal Display*, Hornberger, IBM Technical Disclosure Bull. vol. 12, No. 10, Mar. 1970, pp. 1697, 1998.

Primary Examiner—Eugene La Roche
Attorney, Agent, or Firm—R. S. Sciascia; J. A. Cooke

[57] ABSTRACT

A projection display for producing a bright image of pictorial quality from a large time bandwidth video signal produced by a plurality of light emitting diodes (LED's).

8 Claims, 2 Drawing Figures

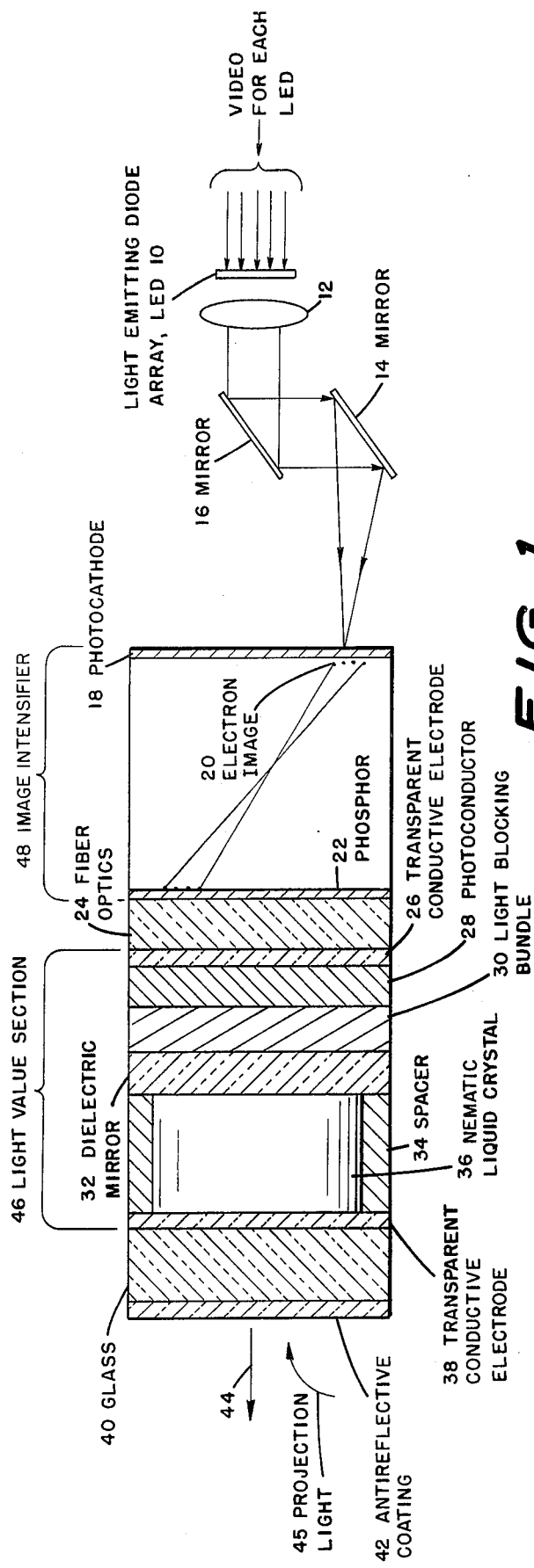
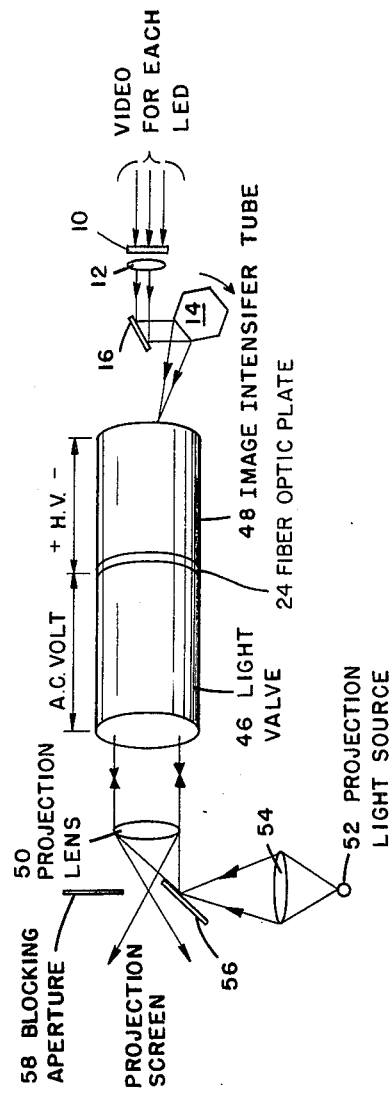
FIG. 1
FIG. 2

LED IMAGE TUBE LIGHT VALVE

BACKGROUND OF THE INVENTION

The present invention relates generally to light projection systems and more particularly to light valve projection systems.

Conventional scanning and display devices have suffered from time bandwidth limitations since they have generally relied upon standard television systems utilizing conventional vidicon tube scanners and CRT monitors. The frequency response of these conventional television systems does not provide the resolution necessary for optical surveillance systems especially when coupled to a projection which produces a magnified image.

As a result of these limitations, photodetector scanning arrays have been utilized in conjunction with light emitting diodes which each have a time bandwidth response of approximately 1 to 2 megahertz. Since each element of the array increases the bandwidth, a typical array of 100 elements provides a bandwidth of 100 to 200 megahertz which is sufficient information for a detailed image on even a large screen.

However, it has been found that an LED output array does not produce sufficient light to project a bright picture without further amplification. Although light valves have been used to amplify light, they are generally used used in conjunction with conventional television systems rather than LED's since the output of the LED's is insufficient to activate the light valve. Therefore, the prior art systems leave the choice between a photodetector scanning array in conjunction with LEDs which gives a projected picture with good clarity and resolution but insufficient brightness, or a conventional scanning and display device which produces a picture that is sufficiently bright but lacks clarity and resolution.

SUMMARY OF THE INVENTION

The present invention overcomes these disadvantages and limitations by inserting a vacuum tube image intensifier between a LED image display and a light valve. The invention includes a conventional reflective type light valve connected to an image intensifier tube by way of optic fibers to control the system's linearily. A mechanically operated lens and prism device may be used to scan the image bearing LED radiation onto the external face of the photocathode of the image intensifier. Weak light produced by the LED array is amplified in the image intensifier tube and projected via fiber optics to the light valve. The image intensifier acts as an amplifier and a wavelength converter of the incident image bearing radiation. The light valve produces an output image which is created by a high intensity light source controlled by the amplified LED array light.

It is therefore an object of the present invention to provide an improved light projection device.

It is also an object of the present invention to provide a light projection device for intensifying faint sources of light.

Another object of the invention is to provide a compact and inexpensive device for projecting the outputs of LED into a bright image.

Yet another object of the present invention is to provide a light projection device for converting the wavelength of dim incident image information from the invisible to the visible spectrum.

Other objects, advantages and novel features of the invention will become apparent from the following detailed description of the invention when considered in conjunction with the accompanying drawings wherein:

BRIEF DESCRIPTION OF THE DRAWINGS

FIG. 1 discloses a cross-sectional view of one embodiment of the present invention tube in conjunction with a device for scanning an LED array.

FIG. 2 is a side view of a display device using the embodiment shown in FIG. 1.

DETAILED DESCRIPTION OF THE PREFERRED EMBODIMENT

FIG. 1 discloses a cross-sectional view of image intensifier vacuum tube 48 optically coupled by a fiber optic plate 24 to light valve 46 and the associated light input optics. The light emitting diode array 10 emits image information which is condensed by lens 12 and reflected by stationary mirror 16 to rotating mirror 14 which continuously scans the image bearing radiation across the face of the photocathode 18 of the image intensifier section 48. Upon local reception of the image, the photocathode produces an electron image 20 which is accelerated by the applied electric field across the vacuum of image intensifier 48 onto phosphor surface 22 to produce an intensified, unbroken visible image on the the phosphor surface 22. The wavelength of the image information may be in either the near infrared, visible, or ultraviolet spectrum. This intensified visible image is transmitted traversely from the image intensifier section 48, through fiber optic plate 24, to a transparent conductive electrode 26 which is the initial layer of the light valve section 46.

Electrodes 26 and 38 consists of a thin film of metal, e.g., silver, which are thin enough to pass light and still apply an electrical potential across the light valve section 46. The visible light created by phosphor 22 thereby passes through the electrode 26 and activates photoconductor 28 which becomes locally electrically conductive at the point where impinged by light, causing current to flow from electrode 26 through that area of the photoconductor 28 which has been light activated, in an amount that is in proportion to the amplitude of the impinging light. Light blocking bundle 30 is an optically opaque layer for local traverse electrical conduction in response to activation by the current from photoconductor 28. This current is transmitted through dielectric mirror 32 to the nematic liquid crystal 36 and finally to the transparent conductive electrode 38 to complete the circuit.

Current is therefore caused to flow through each of the layer of the light valve section 46 at those points colinear with and opposite to the light produced by the image intensifier 48 in proportion to the amplitude of the light from the image intensifier section. This flow of current causes the nematic liquid crystal 36 to change from a normally cloudy state to a progressively clearer state as the current increases, the nematic crystal therefore creates a gradient of transparency proportional to the image transmitted by LED's 10. When an intense projection light, such as 45, is projected through antireflective coating 42, glass layer 40, and transparent conductive electrode 38 into the nematic liquid crystal 36, only a portion of the light is transmitted to the dielectric mirror 32 and reflected out of the device onto a projection screen as shown by 44 and illustrated in FIG. 2. Since the gradient of transparency in the nematic crystal 36 is representative of the input LED image, the intense output projection beam is spacially proportional to the LED image but has a much higher amplitude to produce a bright image on a projection screen.

FIG. 2 illustrates the overall system of an application of the preferred embodiment. As shown therein, mirror 14 can constitute a rotating hexagonal mirror for scanning the image across the photo cathode 18. A high voltage potential is applied across the image intensifier tube 48 while an alternating potential is applied across the light valve section 46. Projection light source 52 creates an intense beam suitable for projecting an image on a projection screen. The light is condensed by lens 54 and reflected by mirror 56 for transmission into the light valve section 46 via projection lens 50. The output projection image is focussed by projection lens 50 and transmitted to the projection screen via blocking aperture 58.

The primary advantage of this device is that it produces a bright image of pictorial quality from a large time bandwidth video signal. For instance if each LED channel carries a 1 megahertz video signal and there are 200 LED's, then the display has a time-bandwidth of 200 megahertz. However, the phosphor 22 of the image intensifier section 48 stores the image that is impressed and in effect reduces the time bandwidth. For example, when the scanning device is looking at a scene that is not changing, the video signal for each channel is a function of the scanner resolution, the area of the scene and the frame time. Each LED is still generating a megahertz of video information. At the phosphor output however, the picture is in a steady state having zero change. The storage effect of the phosphor therefore allows the light valve to respond to the high video bandwidth of the LED array because time is essentially removed from consideration without a loss of information.

The present invention therefore provides a projected image of scanned data having both high information content and considerable brightness.

Obviously many modifications and variations of the present invention are possible in light of the above teachings. For example, the light valve section could just as well be used in a projection mode as well as a reflective mode as shown. In addition, the LED array could be made in two dimensions rather than linear and coupled directly to the photocathode 18. Also, CRT data could be imaged onto the photocathode 18 to produce an inexpensive TV projection system. It is therefore to be understood that within the scope of the appended claims the invention may be practiced otherwise than as specifically described.

I claim:

1. A light projection device for transforming a dim, high resolution image into a bright, high resolution image for projection onto a screen, comprising:
   a linear array of light emitting means for producing said dim, high resolution image;
   image intensifier means for producing an intensified image from said dim, high resolution image;
   a fiber optic plate connected to said image intensifier means to transversely convey said intensified image;
   light valve means for transforming said intensified image into an electrical potential gradient and a gradient of transparency proportional to said intensified image to control the gradient of intensity of a high intensity projection light to produce said bright, high resolution image.

2. The device of claim 1 wherein said light emitting means constitutes light emitting diodes.

3. The device of claim 1 wherein said image intensifier means constitutes a vacuum tube with a photocathode surface located opposite a phosphor surface and a high voltage potential applied between both said surfaces.

4. The device of claim 1 wherein said light valve means comprises:
   a transparent conductive electrode located adjacent to said fiber optics;
   a photoconductive layer located adjacent to said transparent conductive electrode;
   an electrically conductive light blocking layer located adjacent to said photoconductive layer;
   a dielectric mirror located adjacent to said light blocking layer;
   a nematic liquid crystal located adjacent to dielectric mirror;
   a transparent conductive electrode located adjacent to said pneumatic liquid crystal.

5. The device of claim 4 wherein said light emitting means constitutes light emitting diodes.

6. The device of claim 4 wherein said image intensifier means constitutes a vacuum tube with a photocathode surface located opposite a phosphor surface and a high voltage potential applied between both said surfaces.

7. A light projection device as set forth in claim 6 wherein said image intensifier means constitutes a plurality of optically coupled vacuum tubes, each having a photocathode surface located opposite a phosphor surface and a high voltage potential applied between both said surfaces.

8. A light projection device for transforming a high resolution, dim image into a high resolution, bright image, comprising:
   a source of direct current voltage having at least two terminals of opposite relative polarity;
   a vacuum tube image intensifier including a photocathode electrically coupled to a first terminal of said direct current voltage source and an electroluminescent surface electrically coupled to said a second terminal of said direct current voltage source positive relative to said first teminal, the photocathode and the electroluminescent surface being spaced to form opposed, parallel end walls, for local emission of visible image bearing radiation of intensity greater than the intensity of said dim image in response to incidence of radiation bearing said dim image upon the exterior face of the photocathode;
   a fiber optic plate having a first face and a second face, the first face being optically coupled to the exterior surface and the vacuum tube end wall formed by said electroluminescent surface;
   an alternating polarity voltage source;
   projection light means;
   a reflective liquid crystal light valve having at least two parallel transparent electrodes positioned at opposite ends and electrically coupled across said alternating polarity voltage source, one electrode being optically connected to the second face of said fiber optic plate, and a second electrode having one face exposed to said projection light means, for selectively reflecting the light of said projection light means in dependence upon the reception of said visible image bearing radiation whereby an unbroken visible representation of intensity greater than said visible image bearing radiation is projected.

* * * * *